Nov. 8, 1938.          P. C. PALMER          2,136,118
APPARATUS FOR TREATING FOOD PRODUCTS
Filed Jan. 24, 1936          6 Sheets-Sheet 3

INVENTOR
Paul C. Palmer.
BY Austin & Dix
ATTORNEYS

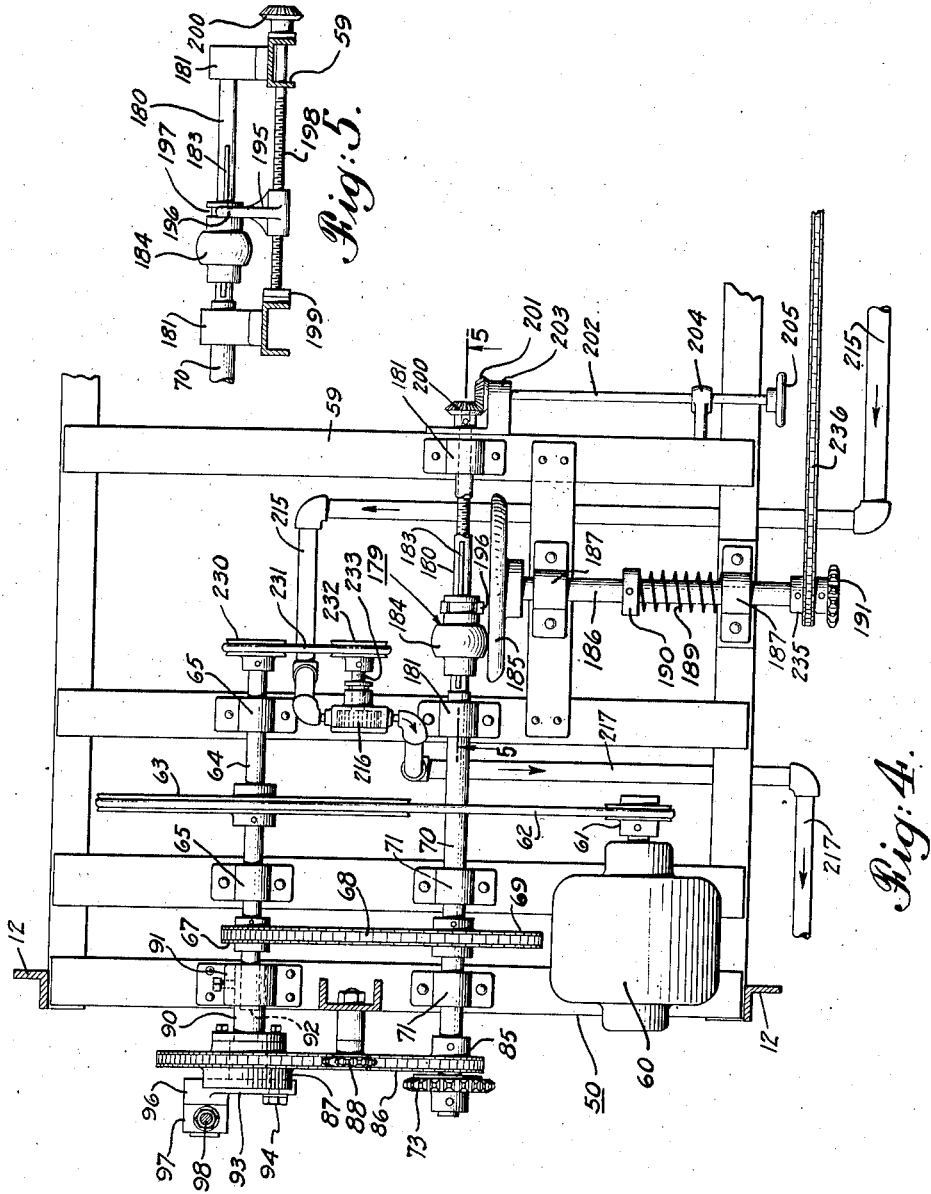

Nov. 8, 1938.　　　　　P. C. PALMER　　　　　2,136,118
APPARATUS FOR TREATING FOOD PRODUCTS
Filed Jan. 24, 1936　　　　　6 Sheets-Sheet 5
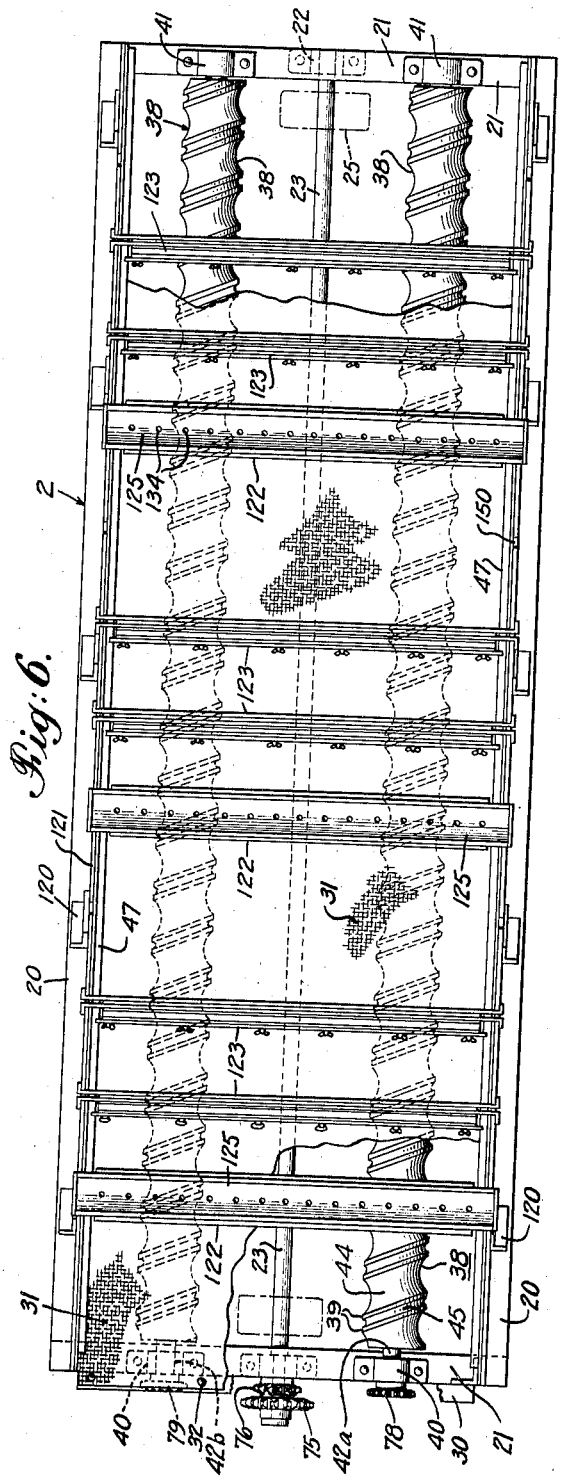
Fig. 6.
Fig. 7.
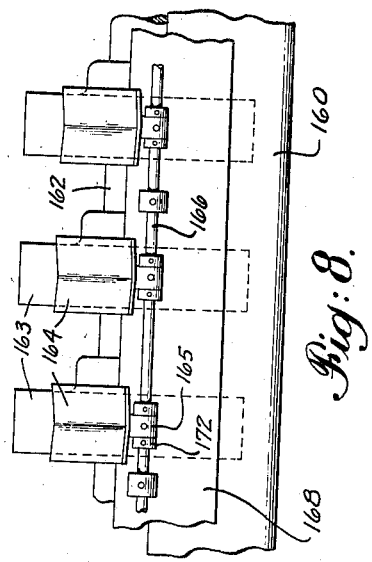
Fig. 8.
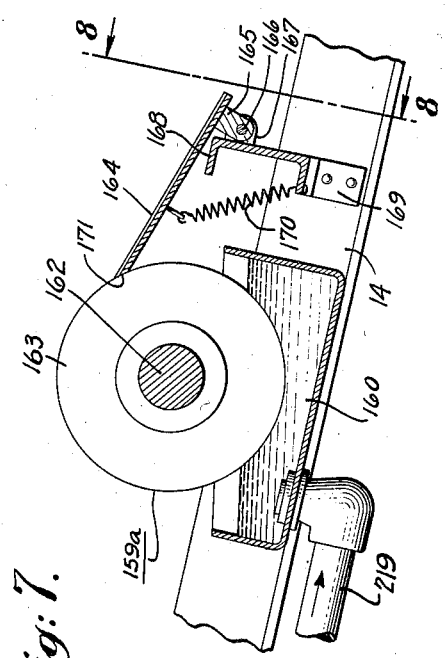
INVENTOR
*Paul C. Palmer.*
BY Austin & Dix
ATTORNEYS Nov. 8, 1938.   P. C. PALMER   2,136,118
APPARATUS FOR TREATING FOOD PRODUCTS
Filed Jan. 24, 1936   6 Sheets-Sheet 6
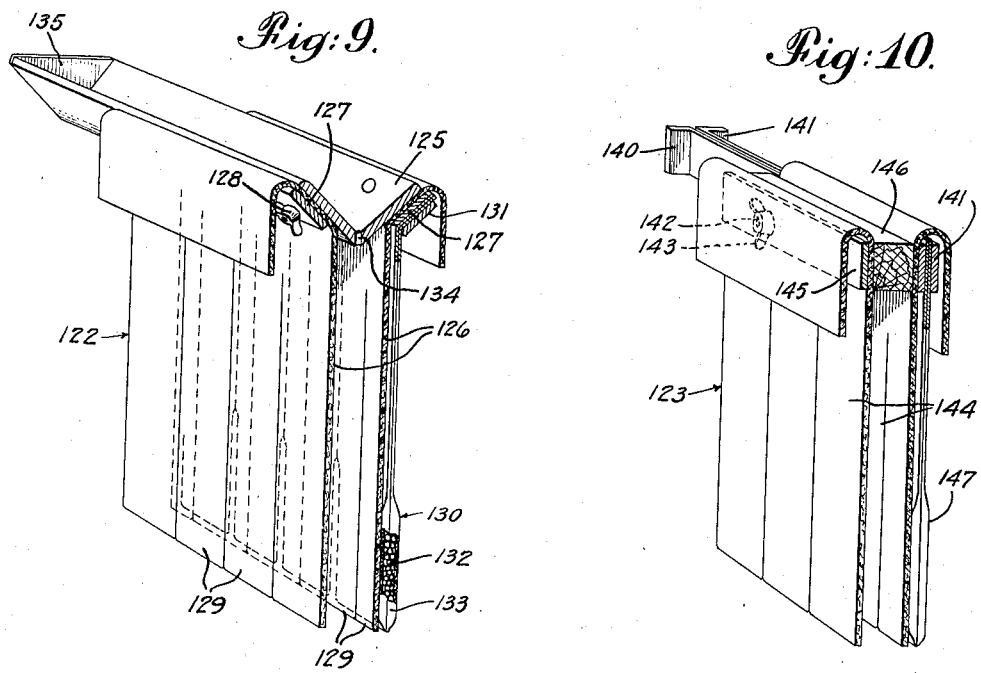
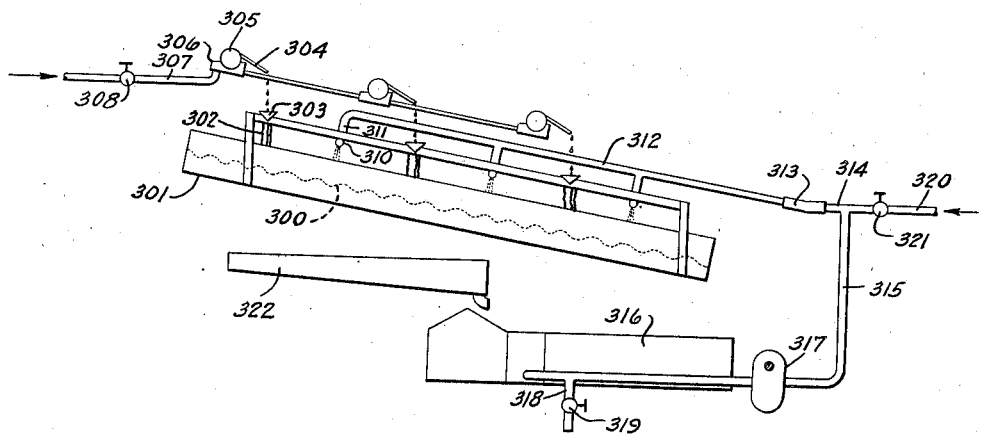
INVENTOR
Paul C. Palmer.
BY Austin & Dix
ATTORNEYS Patented Nov. 8, 1938

2,136,118

UNITED STATES PATENT OFFICE 2,136,118

APPARATUS FOR TREATING FOOD PRODUCTS

Paul C. Palmer, Orlando, Fla., assignor to Duzzel Corporation, Dover, Del., a corporation of Delaware Application January 24, 1936, Serial No. 60,591

17 Claims. (Cl. 91—38)

This invention relates to an apparatus for treating food products such as fruits, vegetables, nuts and the like, in order to prepare them for use, storage or marketing.

It is frequently desirable to subject certain grown fruits, vegetables and nuts, such as citrus fruits, apples, tomatoes, potatoes, pecans, walnuts and the like, hereinafter classed as "fruit", to various treatments or combinations of treatments subsequent to harvesting them, in order to inhibit and delay their natural tendency to deteriorate, and to make them more attractive in appearance. Among such treatments are washing, rinsing, drying, applying a coloring, sterilizing, preservative or polishing material to the surface of the fruit, or one or more of these. In carrying out the foregoing and other treatments, and especially where delicate, readily injured or easily deteriorating products are involved, it is preferably desirable to effect treatment of the entire surface of the articles without causing injury to the surface or accelerating in any way the tendency to deteriorate.

The present invention provides for the treatment of fruit by imparting thereto a combined forward tumbling and sidewise tumbling motion, and forcefully contacting all portions of the moving fruit with suitable treating members which are adapted to contact the entire surface of the fruit with a film but yielding pressure, and apply a treating material, or otherwise modify the condition of the surface.

The invention further relates to a simple but highly efficient treating device for contacting all portions of the surface of the fruit with a firm but yielding pressure while the fruit is being fed with a forward tumbling and sidewise tumbling movement, and which is adapted to rub the surface of the fruit, and simultaneously apply thereto a liquid reagent or reagents or to operate in conjunction with other reagent-applying means for distributing or smoothing a reagent on the surface of the fruit. The treating device also permits the reagent or reagents to be applied as a series of successive coatings, or as a composite coating constituted by a series of successively applied layers.

The invention also comprises a device for feeding a liquid reagent to suitable treating members at a predetermined, readily controllable rate, relatively free from solid or other impurities and with a minimum of waste or contamination of the reagent, which device may be easily charged with a reagent or reagents, and readily cleaned if necessary, and which is suitable for use with any one of a large number of different reagents including those which evaporate rapidly and those which tend to become sticky or gummy. The device also permits a reagent or reagents to be supplied in varying amounts to the several treating members of a series whereby the reagent or reagents may be applied to the fruit by members having different degrees of saturation.

The invention further provides a unified driving arrangement which is simple and rugged in construction, and readily adjustable to varying requirements of use, and is adapted to drive one or more, or all of the moving parts of the apparatus from a single source of energy.

Various other features and advantages of the invention will be apparent from the following particular description, and from an inspection of the accompanying drawings.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which, Fig. 1 is a side elevational view of one form of apparatus embodying the present invention;

Fig. 4 is a view showing a substantially horizontal section taken along the line 4—4 of Fig. 1;

Fig. 5 is a fragmentary view showing a section taken along the line 5—5 of Fig. 4;

Fig. 6 is a top plan view of the cradle constituting the conveyor portion of the apparatus;

Fig. 7 is a fragmentary view, showing a vertical section taken along the line 7—7 of Fig. 2;

Fig. 8 is an elevational view taken along the line 8—8 of Fig. 7;

Fig. 9 is an enlarged fragmentary view in perspective showing the details of construction of the liquid-fed wipers and their supporting arrangement; and Fig. 10 is a similar view showing the non-fed wipers and their supporting arrangement; and Fig. 11 is a somewhat diagrammatic side elevational view of a washer embodying the invention.

Figure 1:
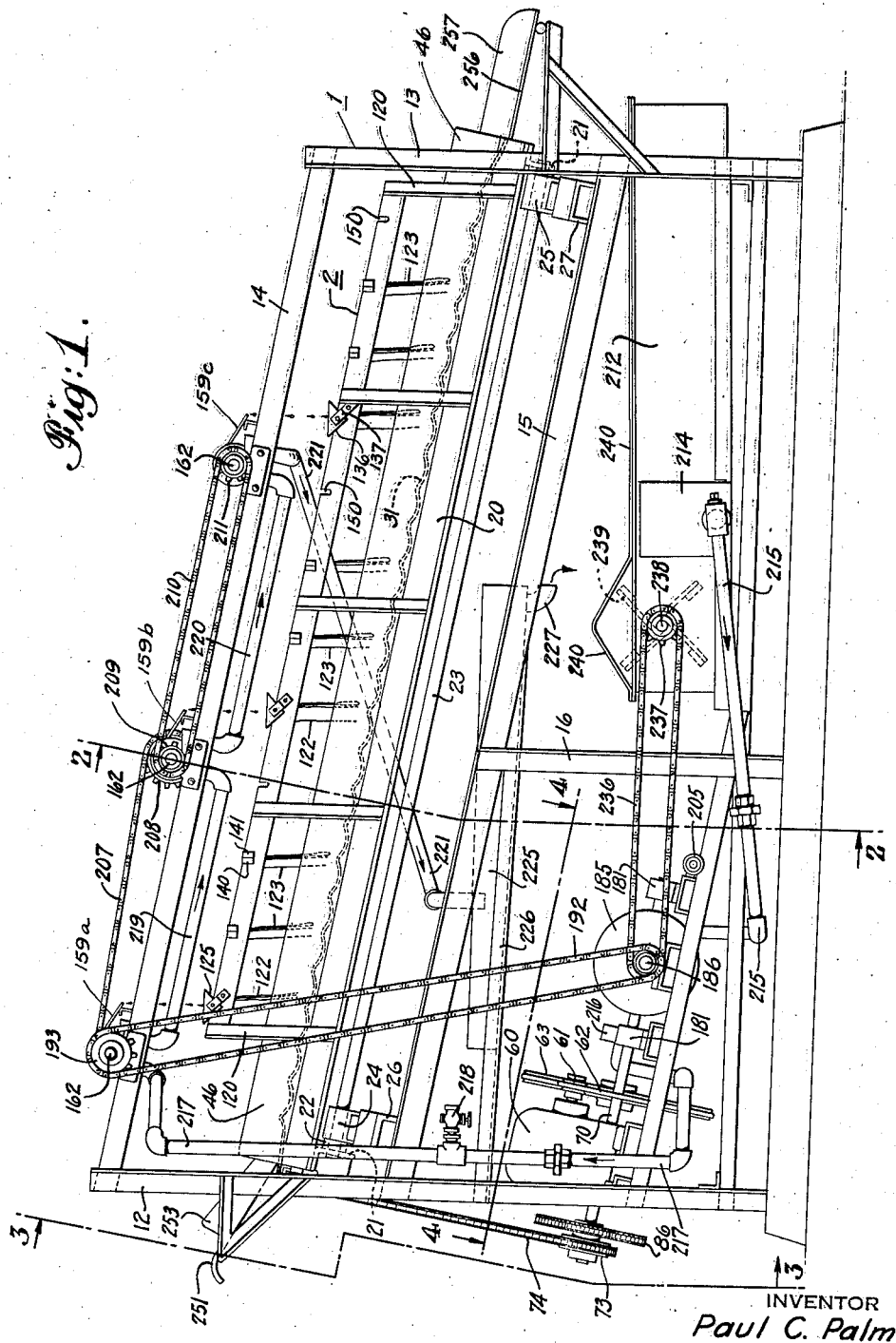
Figure 2:
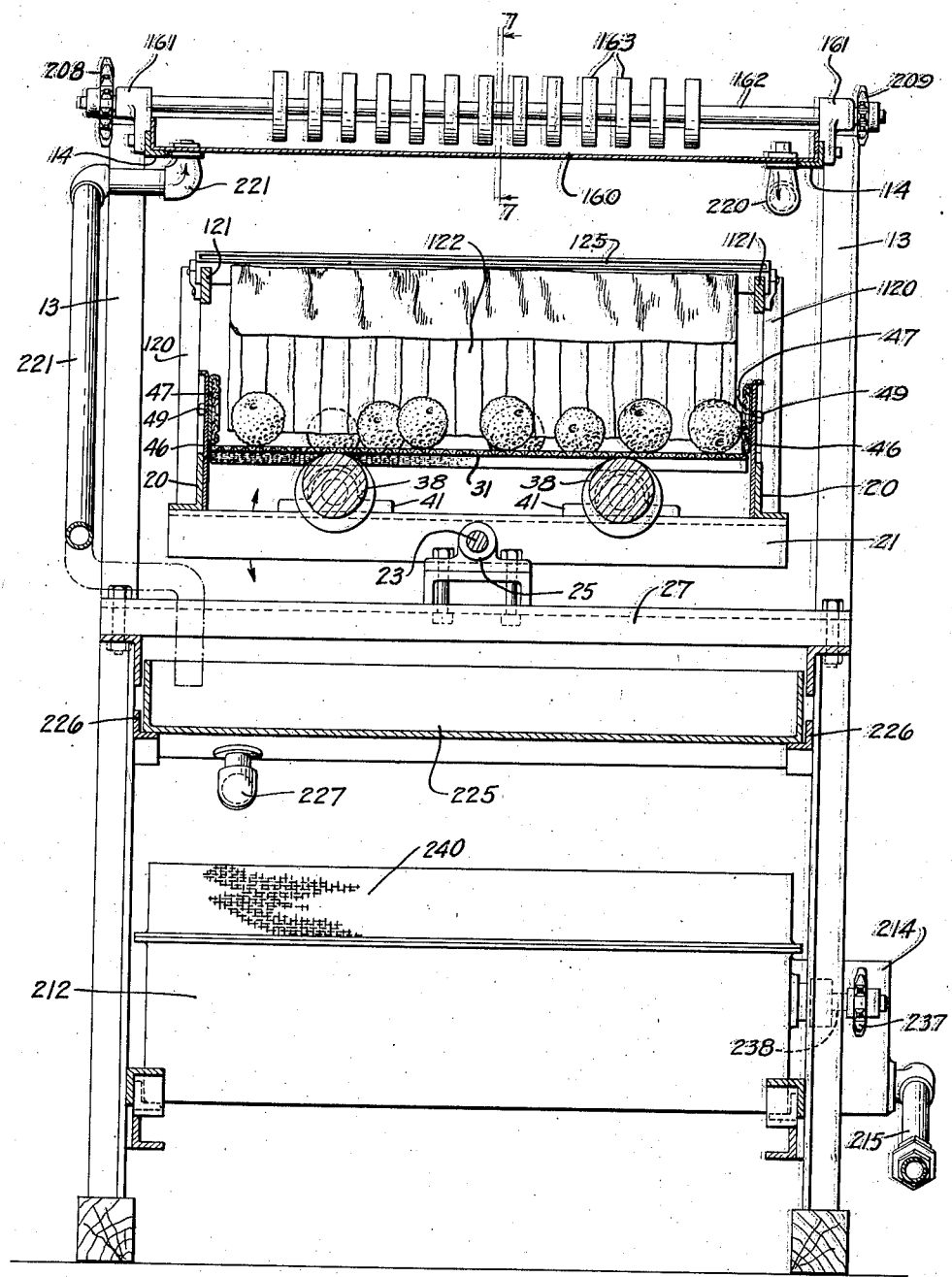
Fig. 2 is a view showing a vertical section taken along line 2—2 of Fig. 1.
Figure 3:
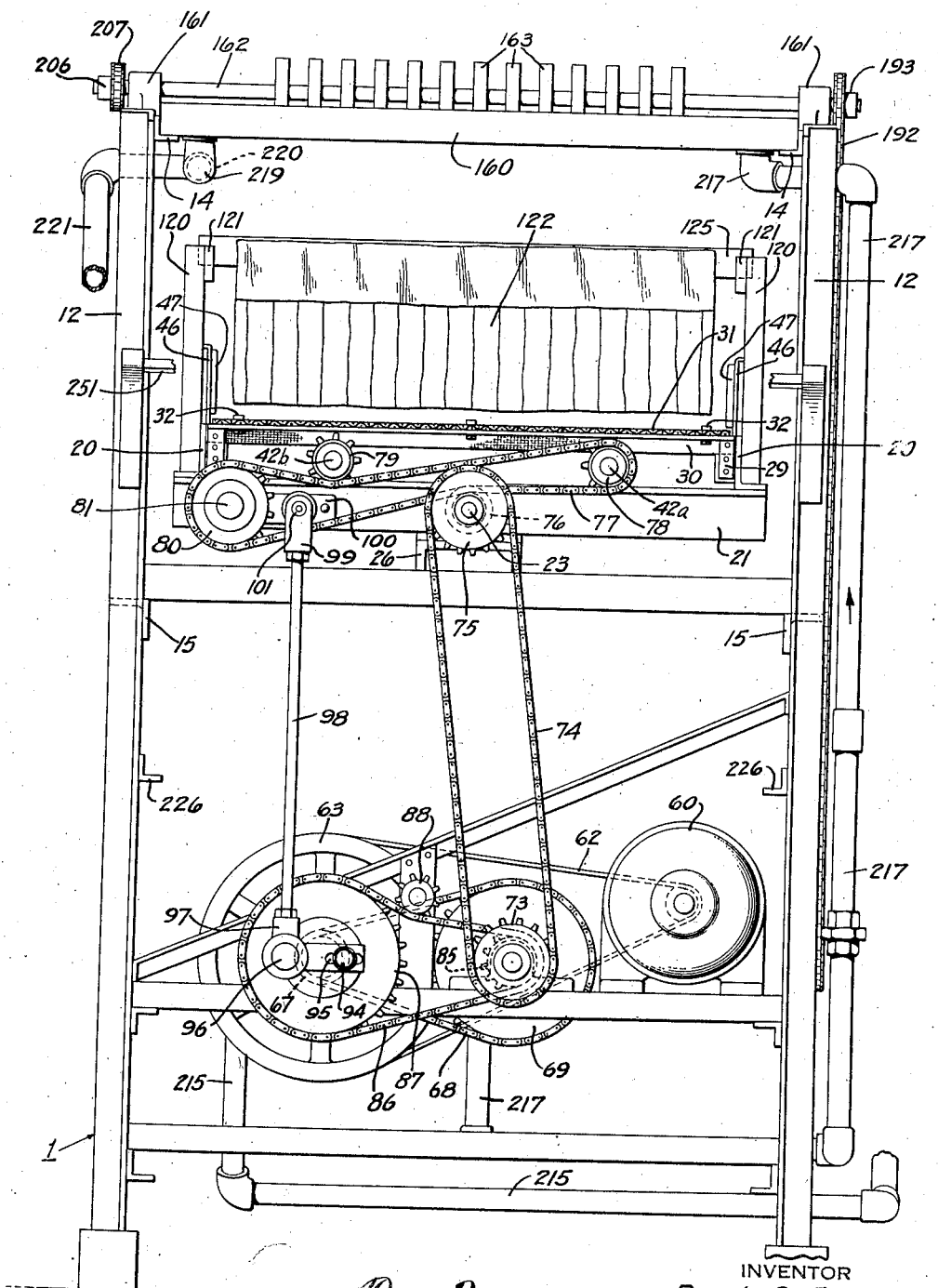
Fig. 3 is a vertical view along the line 3—3 of Fig. 1.

For the purpose of illustration, there is shown in Figs. 1 to 10 a machine suitable for use as an applicator for applying to the surface of certain fruits, vegetables, nuts and the like, various reagents, particularly liquids, which may, with suitable changes, be adapted to carry out other specific operations such as washing, rinsing, drying, dyeing, polishing and so forth.

The applicator comprises a framework 1 having vertical members 12 at one end, vertical members 13 at the other end, top members 14, members 15 extending between members 12 and members 13, and uprights 16.

A cradle 2, rockably mounted on the frame 1, may have a pair of spaced parallel side members 20 and cross members 21. The cross members 21 each carry collars 22 secured to the ends of a rock shaft 23 journalled in pillow blocks 24 and 25, supported on cross beams 26 and 27 secured to members 15. Secured to the side members 20 at their forward ends, are brackets 29 which support a strip 30 extending transversely of the cradle, to which is secured a screen 31, as by means of bolts or other fastenings 32.

The screen 31 extends substantially through the width and length of the cradle, and provides a cradle floor for supporting the food articles. The screen 31 may be formed of wire links or interwoven wires, and has sufficient strength to support the fruit, but sufficient flexibility to permit the formation of corrugations or waves therein, as will be explained more in detail hereinafter. Preferably, the screen is of sufficiently fine mesh to prevent any portion of any of the fruit from projecting through the openings therein, but sufficiently open to permit the ready flow of liquid or gaseous materials therethrough.

The screen 31 rests upon a plurality of screws 38, carried by shafts 42a, 42b, journalled in bearings 40 and 41 mounted on cross members 21. Each screw 38, preferably, is formed with a relatively wide, deep groove 44, and a relatively narrow, shallow groove 45 providing parallel helical edges 39 adapted to engage the screen 31 and generate longitudinally traveling, transverse waves therein when the screws are rotated.

Extending upwardly from each side member 20 is a side wall 46 which projects above the screen 31, and carries on the portion projecting above the screen a bumper or guard 47, constituted of sponge rubber, which may be secured to the side wall 46 by a clamp cooperating with bolts 49. The bumper or guard 47 serves to prevent injury to fruit on the screen 31, which might be caused by the fruit striking against the side wall 46.

A unitary drive 50 may be supported on an inclined frame portion and may be energized by an electric motor 60 driving a pulley 61, over which is trained a belt 62, also trained over a larger pulley 63, carried on a shaft 64. The shaft 64 may be journalled in bearings 65, and drives a sprocket 67 connected by a chain 68 to a sprocket 69 carried on a shaft 70. The shaft 70 may be journalled in bearings 71, and carries at its outer end a sprocket 73, over which is trained a chain 74 which drives a sprocket 75, loosely mounted for rotation on the shaft 23.

The sprocket 75 is secured to and drives a sprocket 76, which meshes with a drive chain 77 trained around a sprocket 78, carried on the shaft 42a, and around a sprocket 80 carried on a stub shaft 81, and passes under a sprocket 79 carried on the shaft 42b to rotate the latter in a direction opposite to the direction of rotation of the shaft 42a.

Also carried on the shaft 70 is a sprocket 85 which drives a chain 86 trained around a sprocket 87 and under an idler sprocket 88. The sprocket 87 may rotate freely on a stub shaft 90 secured in bearing 91, and having a recess 92 serving as a bearing for the shaft 64. Carried on and secured rigidly to the sprocket 87 is an eccentric arm 93 adjustably secured by a bolt 94 extending through a slot 95. The eccentric arm 93 may have a cylindrical head 96 which is received in a connecting head 97 attached to the end of a connecting rod 98 carrying at its other end a connecting head 99 secured to a bracket 100 on the cradle 2 by a pivot pin 101. The bracket 100 is secured to the cross member 21 adjacent one end thereof; thus, by reciprocation of the connecting rod 98, the cradle is rocked about the pivot constituted by the shaft 23.

When the motor 60 is energized, it drives the pulley 61, the belt 62, the pulley 63 and the shaft 64. The shaft 64 in turn drives the shaft 70 through the sprocket 67, the chain 68 and the sprocket 69. The latter shaft drives the sprocket 73, the chain 74 and the sprocket 75, which latter is secured to the sprocket 76 and drives the chain 77. The chain 77 in turn causes the shafts 42a and 42b to rotate in opposite directions, and thus the screws are rotated simultaneously and cause transverse corrugations or waves to travel in succession longitudinally of the screen 31, so long as the motor is energized.

The shaft 70 is connected by sprocket 85, and chain 86 to sprocket 87, which drives the eccentric arm 93, and oscillates the connecting rod 98 to rock the cradle 2 about the shaft 23.

The transversely extending, longitudinally travelling waves formed in the screen 31, together with the inclination of the cradle, cause any generally globular articles disposed on the forward end of the screen to be rolled and irregularly shaped articles to be tumbled along on the screen toward the rear end thereof. In either case the articles may be said to be tumbled along on the screen. The rocking of the cradle causes the surface to be inclined alternately at greater angles than the lateral angle of repose of the fruit; hence the progressing articles are carried from side to side alternately as they are moved forward on the screen. Thus a forward translatory motion, combined with a sideward motion of the articles, is provided for a purpose which will hereinafter appear. Because of the characteristic motion imparted to the articles thereby, the conveyor may be designated as an "ocean wave" conveyor.

The cradle 2 includes a plurality of uprights 120 secured to and upstanding from the side members which support a pair of rack members 121. Supported by the rack members 121 are a plurality of liquid-fed wiper devices 122 and a plurality of non-fed wiper devices 123, preferably arranged with two or more of the non-fed wiper devices 123 interposed between successive of the liquid-fed wiper devices 122.

One of the liquid-fed wiper devices 122 is shown more in detail in Fig. 9, and preferably comprises an angular member 125 to which is secured a pair of depending wipers 126. Each wiper 126 may be constituted by a sheet of soft, pliant and absorbent material such as a sheet of a relatively soft cloth, and may be secured to the trough 125 by a strap 127, and one or more lock nuts 128. Preferably, the wiper 126 is slit throughout the greater portion of its length to provide a series of depending fingers 129. Preferably each wiper device 122 is constituted by at least two wipers 126, one of which is arranged on each side of the trough, and preferably the fingers 129 of the two respectively are arranged in staggered relation.

Hanging along the outer side of the rearmost of the two wipers 126 is a plurality of pressure elements 130 clamped to the trough by a strap 131, which may also be secured by the screws 128. Each pressure element 130, preferably, may be constituted by a flexible bag-like member having a pocket-like portion 133 constituted at its lowermost end and containing a plurality of weighting elements 132 such as shot or other small articles of relatively high density. The trough 125 is provided along its apex or bottommost portion with a series of perforations 134 which permit liquid contained within the trough to drop on to the depending wipers 126. The ends of the trough may be closed by end walls 135.

The wiper devices 122 may rest in notches 136 formed in the members 121, and may be secured in position by attaching brackets 137.

The non-fed devices 123 may be supported from the frame members 121 by oppositely facing bar members 140 and 141, which may be secured together by one or more bolts 142 cooperating with wing nuts 143. Depending wipers 144, generally similar to the wipers 126 previously described, are secured to the bar 140 by a strap member 145 and may be spaced from each other by a block 146. Clamped between the bars 140 and 141 is a pressure element 147 generally similar to the pressure elements 130 previously described. The non-fed wiper devices 123 may be secured by inserting the bars 140 and 141 in notches 150 formed in the frame members 121.

Preferably from 2 to 6 non-fed wiper devices 123 may be provided for each liquid-fed wiper device 122, depending upon operating conditions. In order to provide flexibility in the number of non-fed wiper devices, a sufficient number of notches 150 are provided in the frame member 121 to provide the maximum number of wiper devices 123 desired. As illustrated, three such sets of notches are provided, corresponding to each of the liquid-fed wiper devices 122, but only two such notches of each series of three are shown as being employed, the third notch being left vacant.

Th' lower ends of the depending wiper devices 122 lie in the path of the articles traveling along on the screen 31 and the fruit is forced into contact with the depending fingers 129 and carried past the fingers while in contact therewith. Owing to their flexibility, the fingers are caused to drape around and ride over and around the fruit, as the latter passes through the wipers. The pressure members, depending alongside of the rear wiper 126 cause the fingers to bear against the fruit with a firm, predetermined pressure, which tends to resist the forward movement of the fruit along the screen. This force is not sufficient to ultimately prevent the forward movement of the fruit, but only enough to momentarily halt it and cause it to be rotated substantially in place for a very short period in pressure engagement with the fingers. Thus a positive rubbing of the fruit by the fingers is produced, and in the course of a trip past all of the sets of fingers all surfaces of the fruit is completely rubbed a large number of times.

The fingers 128 are supplied with treating liquid from the trough 125, which liquid drops through the perforations 134 on to the fingers 129. When the fingers 129 are pressed into contact with the fruit, a small amount of the liquid absorptively contained in the fingers is pressed to the surface of the fingers, and is wiped onto the surface of the fruit, and pressed into all depressions, in the surface thereof. Since the fruit is moved about while in contact with the fingers, the liquid thus deposited on the fruit is evenly distributed over the entire surface of the fruit, and is smoothed and levelled thereon.

The operation of the non-fed wiper devices 123 is substantially like the action of the liquid-fed devices 122, except that the wiper fingers 129 are not supplied with liquid. In this case the wiper fingers do not add any liquid to the fruit, but merely distribute and smooth the liquid thereon, and remove any excess which may remain on the surface.

The liquid-fed wiper devices 122 are fed from feeding devices 159a, 159b and 159c, respectively, one of which is illustrated more in detail in Figs. 7 and 8. Each feeding device comprises a trough 160 extending between and which may be supported from the frame members 14. Journalled in bearings 161, carried on the frame members 14, is a transversely extending shaft 162 which may carry a series of wheels 163 adapted to rotate with a portion of each, in the trough 160. Bearing against the periphery of each wheel 163 is a scraper finger 164 carrying a bracket 165 pivotally supported on a shaft 166 carried by a bracket 167. The bracket 167 is secured to a cross member 168, supported on brackets 169 attached to frame members 14. A coil spring 170 is connected between each scraper finger 164 and the cross member 168, in order to hold the finger securely against its wheel 163. Each finger is provided with a bevel 171 for causing the finger to lie flat against its corresponding wheel 163, and each finger also may be slightly curved to cause any liquid thereon to flow toward the center thereof. Collars 172 may be provided for positioning the fingers upon the shaft 166.

The shaft 162 is preferably driven from the motor 60, the power being taken from the shaft 70, which shaft is provided with an extension 180 journalled in bearings 181. The extension 180 is provided with a key 183, and slidably supports on its keyed portion a friction member 184 bearing against a friction disc 185 carried on a shaft 186. The shaft 186 is journalled in bearings 187, and is resiliently positioned to force the friction disc 185 against the member 184 by means of a coil spring 189 bearing against a collar 190 fixed to the shaft 186. The shaft 186 carries a sprocket 191 which drives a chain 192 trained over a sprocket 193 carried on the shaft 162.

The friction member 184 is adjustably positioned on the shaft extension 180 by a fork 195 having spaced arms 196 engaging a grooved portion 197 of the friction member 184. The forked member 195 is threaded onto a shaft 198 rotatably supported in a bearing 199 and in the frame member 59. The shaft 198 carries at its outer end a bevelled gear 200 which meshes with a gear 201 carried on a shaft 202 journalled in brackets 203 and 204, and having at one end a hand wheel 205.

The shaft 162 preferably drives a sprocket 206 over which is trained a chain 207 which drives a sprocket 208. The sprocket 208 is carried on a second shaft 162 corresponding to the second feeding device 159b, which shaft carries a sprocket 209 driving a chain 210, which rotates a sprocket 211 carried on the third shaft 162 corresponding with the third and last feeding device 159c.

The shaft 162 is driven from the shaft 70 through a variable speed drive 179, the shaft 186 and the chain 192, and the other shafts are driven by the chains 207 and 210, respectively. Upon rotation of the shafts 162, as described, the wheels 163 are rotated, and all portions of the periphery pass successively into the liquid contained in the trough 160, and a small amount of liquid is deposited on the wheel and carried around until it reaches the scraper 164, which scrapes the liquid from the wheel and directs it into the underlying trough 125, from whence it drops onto the cooperating fingers 129.

The amount of liquid supplied to the troughs may be controlled to a certain extent by controlling the speed of rotation of the shafts 162, since approximately an equal amount of liquid is scraped from each wheel during each revolution, and hence the more rapid the rate of rotation of the wheels, the greater is the amount of liquid removed therefrom. The rate of rotation of the shafts 162 may be controlled by actuating the hand wheel 205 to vary the ratio of the variable speed drive 179.

A liquid tank 212 may be supported on the frame 1, and is provided with a filling chamber 214 adjacent one side. Communicating with the filling chamber 214 is a conduit 215 which extends to a gear pump 216 which, in turn, communicates with a conduit 217 extending to the first trough 160. Connected to the conduit 217 is a T connection and valve 218, by which another conduit (not shown) may be connected to the conduit 217, if desired.

The first of the troughs 160 is connected by a conduit 219 to the second of the troughs 160; and the second of the troughs 160, is, in turn, connected to the third of the troughs 160 by a conduit 220; and the third trough 160 is connected by a drain pipe 221 to a drip pan 225, supported on the structural members 226, and extending underneath the cradle from the front end up to and slightly underlying the front end of the tank 212. The drip pan 225 is provided with an outlet 227 draining into the tank 212.

Liquid reagent may be drawn from the tank 212 and raised to the first trough 160 by the gear pump 216 which may be driven from the driving motor 60. Carried on the shaft 64 is a pulley 230 over which is trained a belt 231 driving a pulley 232 carried on the shaft 233 of the gear pump 216.

A sprocket 235 may be carried on the shaft 186 which sprocket 235 drives a chain 236, which is trained over a sprocket 237 carried on a shaft 238 journalled in the tank 212. The shaft 238 carries a spider or agitator 239, which serves to agitate the liquid within the tank 212. A screen 240 may be disposed over, and secured to, the top of the tank 212, to exclude foreign matter, such as twigs, pebbles, leaves and the like, from the tank 212.

Liquid is pumped from the tank 212 by the gear pump 216, which is driven from the shaft 64 when the motor is energized. The pump forces the liquid through the conduit system, and lifts it up to the first trough 160, whence it is supplied to the trough 125 of the first wiper device 122. A certain amount of liquid flows from the first trough 160 by gravity through the conduit 219 to the second trough 160, and a certain amount of the liquid in the latter trough flows therefrom to the third trough 160 by way of the conduit 220. As described, the liquid is returned from the third trough 160 to the drip pan 225, which cooperates with the tank 212 in receiving all of the liquid which drips from the articles supported on the screen 31.

The apparatus may be provided with a feeding apron 251, which may be supported from the frame 1 adjacent the front end of the cradle 2, and may be provided with side walls 253. Adjacent the rear end of the cradle, and supported from the frame, there may be provided a discharge apron 256 having side walls 257. Thus, the apparatus may be connected to feeding and discharging conveyors, or to other treating devices.

From the foregoing it should be apparent that the apparatus shown in Figs. 1 to 10 is suitable for applying to the surface of fruit various types of liquid treating materials, such as, for example, mould-inhibiting materials, shrinkage-inhibiting materials, polishing materials, coloring materials and others. Also, the apparatus may be employed for distributing, smoothing or polishing previously applied materials. Since the rubbing action of the wiper devices causes the entire surface of the fruit to be repeatedly rubbed, firmly but gently, without injury to the surface.

The apparatus shown in Figs. 1 to 10, and described above, is not limited to use as an applicator, but, with certain modifications and alterations in the structure, or variations in the manner of using, may be employed in other treating operations as, for example, dyeing, washing, rinsing and others. One such modification of the device is shown diagrammatically in Fig. 11.

In Fig. 11 is shown a washer comprising a conveyor 300 carried by a cradle 301, supporting liquid-fed wiper elements 302, fed from troughs 303. The troughs 303 are supplied from scrapers 304, cooperating with rollers 305 which rotate in a trough 306. The trough 306 is in turn supplied from a conduit 307 leading to a suitable supply tank (not shown), and may have a valve 308.

Extending transversely of the cradle, and secured thereto, intermediate the wiper devices 302, are spray pipes 310 provided with numerous small openings in their lower sides, and each connected by a vertical conduit 311 to a header 312. The header 312 may be connected by a flexible connection 313 to a conduit 314. The conduit 314 is connected by vertical conduit 315 to a tank 316 disposed under the conveyor 300. A pump 317 is provided in the conduit 315 for pumping liquid from the tank 316, and supplying it to the header 312 under pressure. A catch pan 322, which receives drippings from the cradle 301 drains into tank 216.

A waste pipe 318 may be connected to the tank 316, and may be provided with a valve 319. A pipe 320 may be connected to a fresh water supply (not shown), and may be provided with a control valve 321.

In operation, the fruit is deposited on the conveyor 300 and tumbled therealong, as described in connection with the applicator. A relatively strong washing solution, as for example a soap solution, may be supplied by the pipe 307 to the trough 306, and through the agency of the roller 305, and the scraper 304 is fed to the trough 306, whence it drops on to the wiper 302. The wiper applies the composition to the surface of the fruit, and at the same time scrubs the fruit with a rubbing action which contacts any adherent foreign matter, such as spray residue, dust, oil or the like, and loosens the same.

After the fruit passes through the first wiper device 302, it is struck by a strong stream of relatively weak, cleansing liquid, which serves to flush from the fruit any foreign matter which has been loosened by the action of the wiper devices. These operations are repeated by each wiper device and each spray. The excess cleansing liquid passes through the conveyor screen, and is collected in the tank 316, whence it is returned to the header 312, in the manner described.

In order that the cleansing solution which is supplied to the headers shall not become too contaminated, a certain amount may be drawn off from the tank 316 periodically. Fresh concentrated solution may be supplied constantly through the pipe 307, and sufficient additional water may be supplied from the pipe 320 to maintain the solution supplied to the headers at a relatively weak concentration. Thus, after the articles have passed the last of the spray pipes 310, there will be no foreign matter thereon, and a desirably small amount of cleansing material.

The structure shown in Fig. 11 may be modified to adapt it for other uses, or may be operated in various ways. For example, the cleansing material may be supplied solely by the spray pipes 310, the wiper devices 302, then serving to distribute the cleansing material and loosen the foreign matter. If desired, the device may be operated as a rinser by supplying clear water to the spray pipes 310.

Various combinations of the washer, rinser, applicator and polisher, above described, may be made.

The several devices may be arranged as a series of separate machines, or a single conveyor may be equipped with successive cooperating mechanisms to render the several sections a washer, rinser and applicator, respectively, or any combination thereof.

The novel arrangement for supporting and transporting the fruit for treatment causes a tumbling movement of the fruit along a more or less serpentine path, and causes all of the surfaces of the fruit to be exposed for treatment during the source of a single trip along the conveyor. Inasmuch as the screen which supports the fruit does not move to any extent relative thereto, and does not grip nor strike the fruit in any way, but merely causes it to move by reason of the general wave-form assumed by the screen, the fruit is not subjected to bruising, puncturing or other injury.

Furthermore, the surface of the screen is sufficiently smooth and uniform to prevent any possibility of the fruit being injured as is the case where certain other types of varying devices are used which subject the articles to more severe abrasion. The screen is sufficiently open to permit liquid or other treating media to pass therethrough, and therefore there is no opportunity for the fruit to pick up an undesired and uncontrolled quantity of the treating reagent while moving over the screen. Furthermore, the gentle vibration of the fruit, caused by its motion along on the screen, causes any considerable excess of treating reagent to be shaken therefrom, and thus the conveyor itself serves to assist in effecting an even disposition of the treating medium on the fruit.

The firm but yielding application of a rubbing pressure to the surface of the fruit, as is furnished by the weighted wiper fingers, causes a very even and complete application of the treating reagent to the surface of the fruit, and causes the reagent to be thoroughly forced into all depressions in the surfaces, and smoothed and levelled thereon. Since the wiper fingers are formed of a soft, yielding material, there is no liability of puncturing or bruising the skin or rind of the articles. The weighted wiper elements also momentarily halt the fruit during its progress along on the screen, which causes the fruit to be rotated in place to expose all portions of the surfaces to the action of the wipers. This also minimizes the tendency of the fruit to be bruised by striking sharply against other fruit on the screen. The several wiper elements provide sufficient segregation of the fruit into small groups so that this tendency to injury, due to bumping, is reduced to a minimum.

The devices for feeding a treating liquid to the wiper elements permit a very closely controllable and highly flexible means for adjusting the amount of liquid fed to the wipers. Furthermore, the arrangement is such that any one or more of the feeding arrangements can very readily be taken out of operation, or can be speeded up relative to the other feeding arrangements so that an increase or decrease in the relative amounts of reagent fed to the several wiper devices may likewise be controlled. The feeding devices are well adapted to feed any type of liquid reagent, and are especially well adapted for feeding a liquid reagent which has a tendency to thicken or become gummy. There is little opportunity for any clogging or stoppage of the feeding arrangement in spite of the fact that the liquid reagent used may become very sticky or thick. In any event, the arrangement provides for quick and easy cleaning thereof, and hence the arrangement is especially desirable for use with any reagents which are difficultly handled in previous types of treating apparatus.

The repeated application of relatively small quantities of treating material, accompanied by the repeated smoothing and distributing action, deposits on the fruit a thin, smooth, compact and closely adherent film or coating, completely enveloping all portions of the surface of the fruit. Thus the coating may be a composite coating formed by a plurality of successively applied and intermixed films, or by a plurality of separate and distinct layers, depending upon the nature of the reagent or reagents, and the manner of applying the same.

The unified driving arrangement is not only simple to construct and compact, thereby permitting the apparatus to be contained and supported on a relatively small framework, but is such that it may, with simple changes, be varied considerably to accommodate itself to varying conditions of use and modification of the apparatus. Inasmuch as all of the driven elements of the apparatus are driven from a single prime mover, the apparatus may readily be moved from place to place, and it can be operated any place where there is a suitable source of electric current. It will be obvious that it will be possible to drive the apparatus with other types of energy than electric current, provided a suitable prime mover is substituted for the electric motor shown. In any event, the present arrangement permits the apparatus to be connected by a single connection to the source of energy.

While certain novel features of the invention have been disclosed and are pointed out in the annexed claims, it will be understood that various omissions, substitutions and changes may be made by those skilled in the art without departing from the spirit of the invention.

What is claimed is:

1. Apparatus for treating fruit comprising a support, an inclined rockable member for supporting fruit, means mounting said member on said support, and means for rocking said member laterally on said support, whereby said fruit is moved forwardly and from side to side on said member.

2. Apparatus for treating fruit, comprising a support, an inclined, flexible member for supporting fruit, means mounting said member on said support, means for generating transverse, longitudinally travelling waves in said member, and means for rocking said member laterally on said support, whereby said fruit is tumbled forwardly along said member and simultaneously tumbled laterally.

3. Apparatus for treating fruit, comprising a support, a rockable cradle, a flexible member carried by said cradle for supporting fruit, means for generating a series of transversely extending, longitudinally travelling waves in said member, means for rocking said cradle laterally, whereby said fruit is tumbled longitudinally and transversely on said member, and means adjacent said member and lying in the path of movement of the fruit on said member for treating said fruit.

4. Apparatus for treating fruit, comprising a support, a cradle rockable on said support, a flexible member carried by said cradle for supporting fruit, a plurality of spaced, parallel, longitudinally extending screw elements engaging the lower face of said member for generating transversely extending, longitudinally travelling waves in said member, means for actuating said screw elements, and reciprocable means connected to said cradle for rocking the same to cause the fruit to be progressed along and tumbled about on said member.

5. Apparatus for treating fruit, comprising a supporting member for the fruit, means for imparting a combined forward-tumbling and transversely-tumbling movement to said fruit, means for treating said fruit including a series of flexible wiper elements depending into the path of movement thereof, and means associated with said elements for pressing the same against the fruit under a yielding pressure, thereby to contact the same with a firm but yielding pressure as it is fed therepast.

6. Means for treating fruit, comprising inclined means including a supporting member for causing fruit to travel forwardly, means for intimately imposing impedance to the forward movement of said fruit in the form of transverse waves in said supporting member, means for inclining the supporting member at an angle in excess of the angle of repose of the fruit to cause the same to be displaced from its path of forward movement, and means including depending flexible wiper elements adjacent said supporting member for applying a liquid to the traveling fruit.

7. Apparatus for treating fruit, comprising a supporting member for said fruit, means for imparting a tumbling and side-to-side rolling movement of said fruit along a tortuous path on said member, and means for treating said fruit including a transversely extending row of flexible, depending wiper elements, and means for supplying a treating liquid to said wiper elements.

8. Apparatus for treating fruit, comprising a supporting member therefor, means for advancing said fruit on said member, means for treating said fruit including a trough-like reservoir extending transversely across and above said member and having an opening in its bottom wall, a flexible wiper element depending from said reservoir, and means securing said wiper element to said reservoir adjacent said opening, whereby liquid from said reservoir will drip onto said wiper element.

9. Apparatus for treating fruit, comprising a supporting member for said fruit, means for advancing said fruit on said member, means for applying a liquid to said fruit, a reservoir for said liquid, a pick-up roll rotating in said reservoir, a take-off element engaging said roll for removing said liquid therefrom, and for supplying said removed liquid to said applying means whereby liquid is picked up from said reservoir as a relatively thin film and is removed from said roll by said take-off element and supplied to said applying means at a predetermined rate, and means for urging said take-off element against said roll with a predetermined controllable pressure.

10. Apparatus for treating fruit, comprising a supporting member for said fruit, means for advancing said fruit on said member, liquid-applying members disposed adjacent said member, means for picking up liquid at a predetermined rate and depositing it in an inclined member as a substantially homogeneous film, a feeding member, means for transferring said liquid from said inclined member to said feeding member and means for conducting said liquid from said feeding member to said liquid-applying members.

11. Apparatus for treating fruit, comprising a support, a cradle rockable on said support, drive means for rocking said cradle, a flexible supporting surface carried by said cradle for supporting fruit to be treated, drive means for generating waves in said surface, a series of wiper elements positioned to treat fruit on said support, means for feeding a liquid to said wiper elements, drive means for actuating said feeding means, and unitary means for actuating all of said drive means.

12. Apparatus for cleansing fruit, comprising means for imparting a combined forward-tumbling and lateral-tumbling movement to said fruit, a flexible contact member lying in the path of movement of said fruit and engageable therewith for effecting a wiping thereof, means for applying yielding pressure to said contact member, and means for supplying a fluid medium to said contact member.

13. Apparatus for treating fruit, including means for transporting the fruit along a predetermined path, a trough of generally V-shaped cross-section disposed above said conveying means and extending transversely of the path of movement of the fruit, a flexible wiper element clamped to and depending from each side of said trough and lying in the path of movement of said fruit, an opening in said trough intermediate the points of attachment of said wiper elements, and means for supplying a treating liquid to said trough.

14. Apparatus for treating fruit, including means for transporting the fruit along a predetermined path, a trough disposed above said conveying means and extending transversely of the path of movement of the fruit, a flexible wiper element suspended from each side of said trough and lying in the path of movement of said fruit, an opening in said trough intermediate the points of attachment of said wiper elements, a weighted pressure element suspended from said trough and adapted to apply pressure to said wiper element when the latter is displaced from normal suspended position, and means for supplying a treating liquid to said trough.

15. Apparatus of the type described, including, a wiper device comprising a plurality of flexible, fibrous, wiper segments arranged in spaced rows, weighted pressure elements associated with said wiper elements respectively, and means for carrying articles to be treated successively through said rows of wiper elements.

16. Apparatus for treating fruit, a wiper device comprising a plurality of flexible dependent wiper elements having their lower ends free, a plurality of weighted pressure elements for said wiper elements, and means for disposing articles to be treated against said wiper elements, whereby said pressure elements force said wiper elements against said fruit with a substantial force.

17. Apparatus for washing fruit and like articles comprising a conveyor for advancing and rotating said articles to expose different portions of the surface of the articles for treatment, flexible wiper elements spaced from the conveyor and adapted to engage with the articles being treated, means for pressing said wiper elements against said articles, and means for projecting washing fluid against said articles during their passage along said conveyor.

PAUL C. PALMER.